United States Patent
Crimmins et al.

(10) Patent No.: US 9,701,824 B2
(45) Date of Patent: Jul. 11, 2017

(54) POLYOLEFIN DISPERSION COMPOSITIONS FOR MAKING HIGH VAPOR TRANSPORT HYDROPHOBIC COATINGS

(71) Applicant: Dow Global Technologies LLC, Midland, MI (US)

(72) Inventors: Matthew Crimmins, Saint Charles, MI (US); David L. Malotky, Midland, MI (US); Jay D. Romick, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 16 days.

(21) Appl. No.: 14/977,897

(22) Filed: Dec. 22, 2015

(65) Prior Publication Data

US 2016/0177075 A1    Jun. 23, 2016

Related U.S. Application Data

(60) Provisional application No. 62/095,875, filed on Dec. 23, 2014.

(51) Int. Cl.
| | |
|---|---|
| *C08L 23/08* | (2006.01) |
| *C08L 23/06* | (2006.01) |
| *C08L 23/16* | (2006.01) |

(52) U.S. Cl.
CPC .............. *C08L 23/06* (2013.01); *C08L 23/08* (2013.01); *C08L 23/0815* (2013.01); *C08L 23/0869* (2013.01); *C08L 23/16* (2013.01); *C08L 2205/025* (2013.01); *C08L 2666/36* (2013.01)

(58) Field of Classification Search
CPC ...... C08L 23/06; C08L 23/08; C08L 23/0815; C08L 23/0869; C08L 23/0876
USPC ....................................................... 523/221
See application file for complete search history.

(56) References Cited

U.S. PATENT DOCUMENTS

| | | |
|---|---|---|
| 3,645,992 A | 2/1972 | Dow |
| 4,076,698 A | 2/1978 | Anderson et al. |
| 4,922,781 A | 5/1990 | Peiji |
| 5,272,236 A | 12/1993 | Lai et al. |
| 5,278,272 A | 1/1994 | Lai et al. |
| 5,504,172 A | 4/1996 | Imuta et al. |
| 5,938,437 A | 8/1999 | DeVincenzo |
| 8,394,884 B2 | 3/2013 | Kotori et al. |
| 8,475,878 B2 | 7/2013 | Claasen et al. |
| 8,916,640 B2 * | 12/2014 | VanSumeren .............. C08J 3/02 521/70 |
| 2005/0123689 A1 | 6/2005 | Branlard et al. |
| 2007/0292705 A1 | 12/2007 | Moncla et al. |

FOREIGN PATENT DOCUMENTS

| | | |
|---|---|---|
| EP | 1426391 A1 | 6/2004 |
| GB | 951549 A | 3/1964 |
| WO | 00/01745 A1 | 1/2000 |
| WO | 2009097175 A1 | 8/2009 |
| WO | 2011011707 A2 | 1/2011 |
| WO | 2011068525 A1 | 6/2011 |
| WO | 2012138348 A1 | 10/2012 |

* cited by examiner

*Primary Examiner* — Edward Cain
(74) *Attorney, Agent, or Firm* — Andrew E.C. Merriam

(57) ABSTRACT

The present invention provides compositions for water vapor permeable hydrophobic coating comprising a blend of (i) a primary polyolefin dispersion of one or more large particle size polyolefins having a melting point of at least 95° C., and an average particle size of from 1 to 5 microns, and containing a volatile base and a 14 to 40 carbon long chain linear carboxylic acid dispersing agent, and (ii) a film forming second dispersion of one or more polymers having an average particle size of from 0.1 to 1.0 microns chosen from one or more polyolefins having a melting point from 50 to 90 ° C. further containing an at least partially neutralized olefin containing dispersing agent, one or more alkyl celluloses which further contain a plasticizer having a boiling point of 250° C. or greater and containing an at least partially neutralized olefin containing dispersing agent, and one or more acrylic emulsion polymers having a Tg of from 0 to 60° C. wherein the particle size ratio of the primary polyolefin dispersion to the second dispersion ranges from 3:1 to 29:1.

10 Claims, No Drawings

POLYOLEFIN DISPERSION COMPOSITIONS FOR MAKING HIGH VAPOR TRANSPORT HYDROPHOBIC COATINGS

The present invention relates to aqueous polyolefin dispersion blends for use in coatings and comprising a large particle size primary polyolefin dispersion and a small particle size, film forming second dispersion polymer.

Hydrophobic coatings and films have been proposed for a variety of uses, including packaging and building construction applications. Packaging in the form of plastic films, plastic bags, plastic wraps and coated or sized paper is often made hydrophobic to insure wet strength and to keep unwanted moisture in the form of liquid water out of the package itself. However, previous efforts at forming hydrophobic coatings have resulted in compositions that provide inadequate porosity in the resulting coatings to enable high vapor transport rates in the coating. Thus, where packaging for produce, like vegetables or fruit, will keep water out, it will also lock moisture in and thereby facilitate the rotting of the produce. In construction, building wraps, coatings and membranes formed from coatings may provide an air barrier; however, such coatings and membranes that allow moisture to pass through them may absorb moisture as well, causing the coating or membrane to swell. Thus, there remains a need for a composition that forms a vapor permeable coating or film and which is truly hydrophobic and resists water swelling.

U.S. Pat. No. 8,394,884, to Kotori et al. discloses blends of polyolefin dispersions for making can coatings. The Kotori blend compositions seek chemical resistance and provide hydrophobicity in coatings without pinholes or bubbles. However, the smaller particles in the Kotori polyolefin dispersion blend fill in the holes made by the larger particles in the polyolefin dispersion blend. This insures that the films or coatings made from the Kotori compositions do not allow for an acceptable vapor transport rate in a hydrophobic coating or film.

The present inventors have endeavored to solve the problem of providing compositions that enable provision of a coating or film which provides a high water vapor transport rate (MVTR), while providing a hydrophobic surface to inhibit liquid water penetration into or through the coating or film.

STATEMENT OF THE INVENTION

1. In accordance with the present invention, compositions comprise a blend of (i) a primary polyolefin dispersion of one or more large particle size polyolefins having a melting point of from 95 to 180° C. or at least 100° C., preferably, from 120 to 160° C. and an average particle size of from 1 to 5 microns, or, preferably, 1 to 3 microns, and containing a volatile base and a 14 to 50 carbon, or, preferably, 16 to 36 carbon long chain linear carboxylic acid dispersing agent, and (ii) a film forming second dispersion of one or more polymers having an average particle size of from 0.1 to 1.0 microns, preferably, from 0.12 to 0.7 microns or, more preferably, from 0.12 to 0.5 microns the film forming second dispersion chosen from an amount of from 10 to 40 wt. % or, preferably, from 10 to 30 wt. %, as solids of one or more polyolefins having a melting point of from 50 to 90° C., preferably from 65 to 80° C. with an at least partially neutralized olefin containing dispersing agent, such as an olefin-carboxylic acid copolymer, an amount of not more than 7.5 wt. % as solids of one or more alkyl celluloses which further contain a plasticizer having a boiling point of 250° C. or greater, or, preferably, 300° C. or greater, such as dibutyl sebacate, and containing an at least partially neutralized olefin containing dispersing agent or a fatty acid, and an amount of not more than 17.5 wt. %, as solids of one or more acrylic emulsion polymers having a Tg of from 0 to 60° C. or, preferably, 50° C. or less, wherein in the blend of primary polyolefin dispersion and the second dispersion, the particle size ratio of the primary polyolefin dispersion to the second dispersion ranges from 3:1 to 29:1, preferably 15:1 to 25:1.

2. The compositions in accordance with 1, above, further comprising one or more pigments, such as $TiO_2$, fillers or extenders, such as calcium carbonate, silicates or silica.

3. The compositions in accordance with 1 or 2, above, wherein the (i) primary polyolefin dispersion comprises a long chain linear carboxylic acid having from 14 to 40 carbons, preferably, from 16 to 36 carbons, such as a linear fatty acid.

4. The compositions in accordance with 1, 2 or 3, above, wherein the (i) primary polyolefin dispersion comprises a polyolefin elastomer, a high density polyethylene, ethylene-propylene copolymers, polypropylenes and olefin block copolymers.

5. The compositions in accordance with 1, 2, 3 or 4, above, wherein the (ii) second dispersion polymer is a polyolefin and comprises a polyolefin plastomer, a linear low density polyethylene, and ethylene-$C_4$ to $C_{12}$ olefin copolymers.

6. The compositions in accordance with 1, 2, 3, 4, or 5 above, wherein the (i) primary polyolefin dispersion further comprises an acid functional modified polyolefin, preferably, a maleic anhydride polyolefin copolymer or a maleic anhydride modified polyethylene wax.

7. The compositions in accordance with 1, 2, 3, 4, 5, or 6, above, wherein the melting point of each of the one or more polyolefins in the (i) primary polyolefin dispersion is at least 20° C. or, preferably, at least 30° C. or, preferably, at least 40° C. higher than the melting point of each of the one or more polymers in the film forming second dispersion.

8. The compositions in accordance with any of 1, 2, 3, 4, 5, 6, or 7 above, wherein the amount of the long chain linear carboxylic acid dispersing agent in the (i) primary polyolefin dispersion ranges from 5 to 20 wt. % or, preferably, from 5 to 17 wt. %, based on the total solids of the primary polyolefin dispersion.

9. The compositions in accordance with any of 1, 2, 3, 4, 5, 6, 7, or 8, above, wherein the (ii) second dispersion comprises one or more polyolefin or alkyl cellulose and the amount of the at least partially neutralized olefin containing dispersing agent or fatty acid, in the case of alkyl cellulose, ranges from 6 to 30 wt. % or, preferably, from 7.5 to 26 wt. %, based on the total solids of the second dispersion.

10. The compositions in accordance with any of 1, 2, 3, 4, 5, 6, 7, 8 or 9, above, wherein the (ii) second dispersion comprises an alkyl cellulose dispersion and the amount of the plasticizer ranges from 5 to 20 wt. % or, preferably, from 7 to 17 wt. %, based on the total solids of the second dispersion.

11. A coating on a substrate or a film made from the compositions of any of 1 to 10, above.

12. A method of making the compositions of any of 1 to 10 above, comprising combining one or more primary polyolefin dispersion and one or more film forming second dispersion.

Unless otherwise indicated, all temperature and pressure units are room temperature and standard pressure (STP).

All phrases comprising parentheses denote either or both of the included parenthetical matter and its absence. For example, the phrase "(meth)acrylate" includes, in the alternative, acrylate and methacrylate.

All ranges recited are inclusive and combinable. For example, a disclosure of an average particle size of from 0.1 to 1.0 microns, preferably, from 0.12 to 0.7 microns, or, more preferably, from 0.12 to 0.5 microns will include an average particle size of from 0.1 to 1.0 microns, from 0.1 to 0.15 microns, from 0.1 to 0.7 microns, from 0.12 to 1.0 microns, from 0.5 to 1.0 microns, from 0.7 to 1.0 microns, or from 0.1 to 0.5 microns or, preferably, from 0.12 to 0.7 microns, from 0.5 to 0.7 microns or, more preferably, from 0.12 to 0.5 microns.

As used herein, unless otherwise indicated, the term "average particle size" means a volume mean particle size, as determined using a Coulter LS 13 320 particle size analyzer (Beckman Coulter, Brea, Calif.) per manufacturer's recommended procedures via laser scattering).

As used herein, the term "glass transition temperature" or "Tg" or "measured Tg" refers to the mid-point glass transition temperature of a polymer as determined by differential scanning calorimetry (DSC) scanning from −150° C. to 150° C. while ramping temperature in a sinusoidal modulation (oscillation) pattern overlayed on a conventional linear heating ramp at a ramp rate of 2.00° C./min to 150.00° C., taking the mid-point in the heat flow versus temperature transition as the Tg value.

As used herein, the term "Melt index" means the value determined according to ASTM D-1238 (2013). Melt index values are defined as the amount of polymer melt passing in dg/min (or g/10 min) through a heated syringe with a plunger load at 190° C. and 2.16 kg load for polyethylene polymer and at 230° C. and 2.16 kg load for polypropylene polymer. For olefin copolymers, the polypropylene melt index test will be used if more than 50 wt. % of the copolymer comprises propylene in polymerized form. As used herein, the term "melting point" means the value determined by DSC method using a ramp rate of from 10° C./min.

As used herein, the term "solids" refers to the wt. % in compositions of solids of the primary polyolefin dispersions, the second film forming dispersion, dispersants and stabilizing agents and, when present, pigments, fillers or extenders and any additives that are not volatile under use conditions for the compositions of the present invention. For example, water, additives such as coalescents and solvents or bases, like ammonia or lower alkyl amines that volatilize under use conditions of the compositions of the present invention are not considered solids.

As used herein, the term "substantially free of surfactants, hard bases, or dispersing agents" means that the total solids amounts of such materials, based on the total solids of the compositions ranges 1200 ppm or less or, preferably, 500 ppm or less.

As used herein, the term "volatile base" mean a base that volatilizes at standard pressure at a temperature of from room temperature to 200° C.

As used herein, the term "wt. %" refers to weight percent.

By using two polymer dispersions or, preferably, two polyolefin dispersions, and by adjusting the proportion of these two dispersions, the present inventors have made coatings which provide high rates of vapor transport relative to an uncoated substrate (paper) while maintaining a very hydrophobic surface. The compositions of the present invention combine a larger average particle size polyolefin dispersion stabilized with a fatty acid dispersing agent and an acid functional modified polyolefin, with a smaller average particle size polymer dispersion, e.g., a polyolefin dispersion, stabilized with an olefin containing dispersing agent. The olefin containing dispersing agent provides colloidal stability for the second dispersion polymer compositions, while not providing so much of the dispersing agent that it fills the pore spaces between the primary polyolefin dispersion particles. The second dispersion polymer melts at a temperature well below the melting point of primary polyolefin dispersion, so that it provides for binding strength, but also the open pore coating structure is maintained after curing the film at 90° C.

The compositions of the present invention are useful for making coatings with sufficient porosity/permeability to have high vapor transport rates, while maintaining the hydrophobicity of the coating. In accordance with the present invention, the selected polyolefin dispersions, proportions in the blend and the particle size ratio insure that adequate porosity remains in coatings made from the resulting compositions.

The primary polyolefin dispersion comprise an aqueous polyolefin dispersion of one or more polyolefins having a melting point of at least 90° C. and up to 180° C., or, preferably, at least 110° C. or, preferably, at least 120° C.

The primary polyolefin dispersion has an average particle size of from 1 to 5 microns.

The primary polyolefin dispersion may comprise any polyolefin having the requisite 1 to 5 micron average particle size and a melting point of at least 90° C. or the maximum use temperature below the melting points for the compositions of the present invention. For example, suitable polyolefins may be an ethylene polymer, propylene polymer, propylene/ethylene copolymer, and combinations thereof. Suitable primary polyolefin dispersion polymers may include high density polyethylene (HDPE), polypropylene, ethylene-ethyl acrylate copolymers and olefin block copolymers, such as ethylene-butylene and ethylene octene block copolymers.

Unless otherwise stated, the polyolefins in the primary polyolefin dispersions having the requisite 1 to 5 micron average particle size and a melting point of at least 90° also have no reactive polar groups.

The dispersing agent used to make the primary polyolefin dispersions is substantially free of any polymeric dispersing agent. The dispersing agent can be a long chain fatty acid having from 14 to 40 carbon atoms or, preferably, from 16 to 36 carbon atoms, such as a Unicid™ 350 dispersing agent or behenic ($C_{22}$) acid.

The dispersing agent in the primary polyolefin dispersion is substantially free of acid functional modified polyolefin dispersing agents which will reduce the porosity of the coating.

Suitable ethylene polymers can be selected from the group consisting of polyethylene, an ethylene-copolymer and a combination thereof. Exemplary ethylene polymers can also include homogeneous polymers, as for example described in U.S. Pat. No. 3,645,992; high density polyethylene (HDPE), as for example described in U.S. Pat. No. 4,076,698; homogeneously branched, linear ethylene/propylene copolymers; homogeneously branched, substantially linear ethylene/propylene polymers, which can be prepared, for example, by processes disclosed in U.S. Pat. Nos. 5,272,236 and 5,278,272; and high pressure. The ethylene polymers should have a melting point of 90 to 180° C.

Available ethylene polymers and propylene/ethylene copolymers include, but are not limited to, polymers available as VERSIFY™ DP-4000.01; VERSIFY™ 4200, VER- SIFY™ 4000, VERSIFY™ 3200, VERSIFY™ 3000, and VERSIFY™ 3300 polymers (The Dow Chemical Company, Midland, Mich.), ENGAGE™ 8407 polymer (Dow), INFUSE™ 9807 polymer (Dow), Vistamaxx™ propylene-containing elastomers (ExxonMobil Chemical, Houston, Tex.); commercially available high density polyethylenes such as, but are not limited to, DMDA-8007 NT 7 (Melt Index 8.3, Density 0.965), DMDC-8910 NT 7 (Melt Index 10, Density 0.943), DMDA-1210 NT 7 (Melt Index 10, Density 0.952), HDPE 17450N (Melt Index 17, Density 0.950), DMDA-8920 NT 7 (Melt Index 20, Density 0.954), DMDA 8940 NT 7 (Melt Index 44, Density 0.951), DMDA-8950 NT 7 (Melt Index 50, Density 0.942), DMDA-8965-NT 7 (Melt Index 66, Density 0.952), DMDA-8940 HDPE (Melt Index of approximately 40-48 g/10 min), all from the Dow Chemical Company.

Suitable propylene polymers can include, but are not limited to, 6D43 Polypropylene (Braskem, Philadelphia, Pa.). Generally, the propylene polymer has substantially isotactic propylene sequences. "Substantially isotactic propylene sequences" means that the sequences have an isotactic triad (mm) measured by $^{13}C$ NMR of greater than 0.85; in the alternative, greater than 0.90; in another alternative, greater than 0.92; and in another alternative, greater than 0.93. Isotactic triads are well-known in the art and are described in, for example, U.S. Pat. No. 5,504,172 and International Publication No. WO 00/01745, which refers to the isotactic sequence in terms of a triad unit in the copolymer molecular chain determined by $^{13}C$ NMR spectra.

The polymers useful in the film forming second dispersion can be any chosen from polyolefins having a melting point of from 60 to 95° C., preferably from 65 to 90° C., alkyl celluloses, and acrylic emulsion polymers having a Tg of from 0 to 55° C. wherein in the blend of primary polyolefin dispersion and the second dispersion, the particle size ratio of the primary polyolefin dispersion to the second dispersion ranges from 3:1 to 29:1, preferably 15:1 to 25:1, The dispersion in the film forming second dispersion polymer comprises one or more low melting point polymer, such as a polyolefin dispersion like a low density polyethylene, a linear low density polyethylene, ethylene octene copolymers, ethylene-$C_4$ to $C_{12}$ olefin copolymers.

The film forming second dispersion is stabilized with carboxylic acid functional olefin copolymer dispersing agents, such as ethylene/acrylic acid copolymers like those available as Primacor™ 5980i, or Primacor™ 5990i copolymers (Dow Chemical).

Suitable polymers for the film forming second dispersion may include, for example, heterogeneously branched linear low density polyethylene (LLDPE); heterogeneously branched ultra-low linear density polyethylene (ULDPE); homogeneously branched, linear ethylene/alpha-olefin copolymers; homogeneously branched, substantially linear ethylene/alpha-olefin polymers, which can be prepared, for example, by processes disclosed in U.S. Pat. Nos. 5,272,236 and 5,278,272; and high pressure, free radical polymerized ethylene polymers and copolymers such as low density polyethylene (LDPE) or ethylene vinyl acetate polymers (EVA). Other examples of suitable polymers include, but are not limited to, ethylene ethyl acrylate copolymers, ethylene methyl acrylates, ethylene butyl acrylates, and combinations thereof.

Acrylic emulsion polymers suitable for use in the second dispersion are any having a glass transition temperature of from 0° C. to the upper melting point of a suitable polyolefin, or 55° C., as determined by DSC. Such polymers may be formed by conventional aqueous emulsion polymerization in the presence of a thermal (e.g., persulfate) or redox initiator (e.g., peroxide-bisulfite) of any vinyl monomers or alkyl methacrylates, such as $C_1$ to $C_{18}$ alkyl (meth)acrylates, like methyl methacrylate, butyl acrylate, ethyl acrylate and lauryl methacrylate and from 0.1 to 5 wt. %, based on the total weight of monomers used to make the polymer, of an ethylenically unsaturated carboxylic acid, such as acrylic, methacrylic, maleic and itaconic acids.

Suitable alkyl celluloses for use in the second dispersion may be any of $C_1$ to $C_4$ alkyl celluloses, including ethyl cellulose and methyl cellulose.

In accordance with the present invention, the olefin containing dispersing agent in the second dispersion may be any olefin copolymer with carboxylic acid containing co-monomers or co-reactants.

The olefin containing dispersing agent may be an external stabilizing agent. The second dispersion includes up to 30 wt. % of the olefin containing dispersing agent, based on the total solids weight of the second dispersion. Preferably, the amount of the olefin containing dispersing agent is limited so that the second dispersion can form a coating or film while still creating a porous coating or film.

The olefin containing dispersing agent can have an acid number of equal to or greater than 100, greater than 110, or even greater than 140 and up to 210. The olefin containing dispersing agent can include one or more polar polyolefins, e.g., having a polar group as either a comonomer or grafted monomer. Acid number values (the amount of KOH in mg KOH/g polymer required to neutralize acid functionality when measured by titration) can be measured according to ASTM D-1386 (2010).

Examples of olefin containing dispersing agents include, but are not limited to, ethylene-acrylic acid and ethylene-methacrylic acid copolymers comprising from 10 to 25 wt. % of the acid group containing comonomers, based on the total weight of monomers used to make the olefin containing dispersing agent. Examples of such olefin containing dispersing agents include those available under the trademarks PRIMACOR™, such as PRIMACOR™ 5980i or PRIMACOR™ 5990i, both commercially available from The Dow Chemical Company; NUCREL™ polymer (E.I. DuPont de Nemours, Wilmington, Del.); and ESCOR™ polymer (ExxonMobil Chemical Company) and described in U.S. Pat. Nos. 4,599,392, 4,988,781, and 5,938,437.

The primary polyolefin dispersions of the present invention may include up to about 20 wt. % or, preferably, up to 15 wt. % of any modified polyolefin having a melting point of 105° C. or higher or, preferably, 115° C. or higher and up to 220° C. For example, modified polyolefins can be selected from the group consisting of an acid functionalized polypropylene, an acid functionalized polyethylene homopolymer, a copolymer that has been modified with carboxylic acid groups, a copolymer that has been modified with anhydride groups and a combination thereof. Other suitable modified polyolefins can include graft copolymers and/or block copolymers, such as propylene-maleic anhydride graft copolymer. Examples of groups that can modify the polymer include, but are not limited to, acid anhydrides, carboxylic acids, carboxylic acid derivatives, primary and secondary amines, hydroxyl compounds, oxazolines, epoxides, and combinations thereof.

Specific examples of the groups that can modify the polymer include, but are not limited to, unsaturated cyclic anhydrides and their aliphatic diesters, and the diacid derivatives. For example, maleic anhydride and compounds selected from $C_1$-$C_{10}$ linear and branched dialkyl maleates, $C_1$-$C_{10}$ linear and branched dialkyl fumarates, itaconic anhydride, $C_1$-$C_{10}$ linear and branched itaconic acid dialkyl esters, maleic acid, fumaric acid, itaconic acid, and combinations thereof.

The modified polyolefins can have an acid number of from 10 to 60, less than 50 or, more than 20. Acid number can be determined by ASTM D-1386 (2010). Acid number can refer to an amount of KOH in mgKOH/g polymer required to neutralize acid functionality when measured by titration. Alternatively, the percent functionality can be determined by Fourier Transform Infrared Spectroscopy (FTIR).

Specific examples of modified polyolefins may include, for example, maleic anhydride functionalized polyethylenes, polypropylenes, copolymers of ethylene and propylene and combinations thereof. Examples include, but are not limited to maleic anhydride functionalized polyethylene, such as high density polyethylene, maleic anhydride functionalized polyethylene copolymers, terpolymers and blends may also be used. Maleic anhydride functionality can be incorporated into the polymer by grafting or other reaction methods. When grafting, the level of maleic anhydride incorporation is typically below 3 percent by weight based on the weight of the polymer. Commercially available examples of suitable modified polyolefins include, but are not limited to, the polymers sold under the trade name LICOCENE™, or LICOLUBE™, from Clariant Corporation, such as LICOCENE™ 6452 (e.g., LICOCENE™ PP MA 6452) and LICOCENE™ 4351 (e.g., LICOCENE™ PE MA 4351), the polymers sold under the trade name A-C™ Performance Additives (Honeywell Corporation, Morristown, N.J.) such as AC575™ which is an ethylene maleic anhydride copolymer, and AC-392™ and AC-395™ which are high density oxidized polyethylene; and EPOLENE™ polymers (Westlake Chemical Company, Houston, Tex.). Examples of commercially available maleic anhydride functionalized polyethylene include those available under the tradename AMPLIFY™ (The Dow Chemical Company), such as AMPLIFY™ GR-204 polymer, among others. Amplify™ GR-204 is 2,5-furandione modified ethylene/hexene-1 polymer. Other examples of maleic anhydride functionalized polyethylene are available under the tradename FUSABOND™ (E.I. du Pont de Nemours and Company) such as FUSABOND™ E-100, FUSABOND™ E-158, FUSABOND™ E265, FUSABOND™ E528, FUSABOND™ E-589, FUSABOND™ M-603, among others. Other maleic anhydride grafted polyethylene polymers, copolymers, and terpolymers may include POLYBOND™ (Chemtura, Philadelphia, Pa.), such as POLYBOND™ 3009 and POLYBOND™ 3029, among others; OREVAC™ (ARKEMA, Philadelphia, Pa.), such as OREVAC™ 18510P, among others; PLEXAR™ (Lyondell Chemical Company, Limerick, Pa.) such as PLEXAR™ PX-2049; also grades available under the tradename YPAREX (B.V. DSM Engineering Plastics, Heerlem, The Netherlands), such as YPAREX 8305; and polymers available under the tradename EXXELOR™, such as EXXELOR™ PE 1040(ExxonMobil Chemical Company, Fairfax, Va.). Other examples include LOTADER™ 4210 a random terpolymer of ethylene, acrylic ester and maleic anhydride (Arkema). Additionally, polyethylene functionalized with glycidyl methacrylate may be used.

To facilitate dispersion in aqueous media, the acid groups of any polymer, or dispersing agent may be partially or fully neutralized with a base. In neutralization, the amount of base used may range from 25 to 200% of the acid groups in the polymer or dispersing agent on a molar basis, or, from 50 to 165% on a molar basis, or, from 50 to 150%; or, from 50 to 120%.

Examples of suitable bases include a volatile base. Examples of a volatile base include, but are not limited to, N,N-dimethylethanolamine, ammonia, hydrazine, methylamine, ethylamine, diethylamine, triethylamine, isobutylamine, N,N-diisopropylethylamine, morpholine, piperazine, ethylenediamine, and 1,4-diazabicyclo[2.2.2]octane). The acid groups revert to the acid form upon volatilization of the base, such as in the formation of the coating layer where it can help to promote adhesion of the coating layer to the surface of the substrate.

Amines with boiling points below 250° C. may be used as bases. Other suitable bases can include, for example, an amine such as monoethanolamine, or 2-amino-2-methyl-1-propanol (AMP). Amines useful in embodiments disclosed herein may include diethanolamine, triethanolamine, and TRIS AMINO™ base (Angus, Buffalo Grove, Ill.) NEUTROL™ TE bases (BASF, Leverkusen, Del.), as well as triisopropanolamine and diisopropanolamine (The Dow Chemical Company). Other useful amines may include dimethylamine, trimethylamine, mono-n-propylamine, butylamine, dibutylamine, tributylamine, dimethyl benzyl amine, dimethyl n-propylamine, N-methanol amine, N-aminoethylethanolamine, N-methyl diethanolamine, monoisopropanolamine, N,N-dimethyl propanolamine, 2-amino-2-methyl-1-propanol, 1,2-diaminopropane, tris(hydroxymethyl)-aminomethane, ethylenediamine, N,N,N'N'-tetrakis(2-hydroxylpropyl)ethylenediamine, 3-methoxypropyl amine, imino bis-propyl amine, and the like.

Mixtures of amines may be used.

The base may be an oligomeric amine, e.g. diethylene triamine.

The aqueous phase of the primary polyolefin dispersion and second dispersion may be, for example, water; or in the alternative, the aqueous phase may be a mixture of water and one or more organic solvents, e.g., one or more water miscible solvents or one or more water immiscible solvents, or combinations thereof. The primary polyolefin dispersion composition and the second dispersion composition of the present disclosure, independently include 15 to 90 wt. % of the aqueous phase, based on the total weight of the composition. For example, the aqueous phase content may be in the range of from 30 to 80, or from 35 to 75, or from 40 to 70 wt. %, based on the total weight of the composition.

The compositions of the present invention may optionally be blended with one or more cross-linkers such as those described in PCT Pub. No. WO/2011/011707. These cross-linkers may be organic, or inorganic (i.e., zinc nanoparticles) in nature.

The composition of the present disclosure may also be optionally be blended during or after processing with one or more additive or auxiliary polymer, such as one or more of an acrylic emulsion polymer, vinyl acrylic emulsion polymer, styrene acrylic emulsion polymer, vinyl acetate ethylene emulsion polymer, and combinations thereof; one or more fillers; one or more additives such as catalysts, wetting agents, defoamers, flow agents, release agents, slip agents, anti-blocking agents, additives to mask sulfur staining, pigment wetting/dispersion agents, anti-settling agents, UV stabilizers, adhesion promoters; one or more lubricants such as fatty acid ester wax, silicon-containing wax, fluorine-containing wax, polyethylene or any other similar polyolefin wax, carnauba wax, lanolin wax or the like; one or more corrosion inhibitors such as aluminum, and zinc: one or more pigments, e.g., titanium dioxide, barium sulfate, mica, calcium carbonate, silica, zinc oxide, milled glass, aluminum trihydrate, talc, antimony trioxide, fly ash, and clay or the like; one or more co-solvents, e.g., glycols, glycol ether, 2,2,4-trimethyl-1,3-pentanediol monoisobutyrate, alcohols, mineral spirits, aromatic solvents and benzoate esters or the like; one or more dispersants, e.g., aminoalcohols, and polycarboxylates; one or more surfactants; one or more preservatives, e.g., biocides, mildewcides, fungicides, algaecides, and combinations thereof; one or more thickeners, e.g., cellulosic containing thickeners such as hydroxyethyl cellulose, hydrophobically modified alkali soluble emulsions (HASE thickeners such as UCAR POLYPHOBE TR-116) and hydrophobically modified ethoxylated urethane thickeners (HEUR); or one or more additional neutralizing agents, e.g., hydroxides, amines, ammonia, and carbonates; optionally one or more solvents or coalescing agents.

In addition, the compositions of the present invention may be blended with one or more dispersions, emulsions, suspensions, colloidal suspensions, and the like.

The compositions of the present invention can be formed by any number of methods recognized by those having skill in the art. Generally, the primary polyolefin dispersion and the second dispersion are formed separately and then are blended.

Any acrylic emulsion polymer is formed by polymerization and thereby is a dispersion that can be readily mixed with or into a separate primary polyolefin dispersion.

For making any polyolefin dispersion or alkyl cellulose dispersion, the dispersion equipment can be operated in batch, semi-batch, or continuous mode. Examples of mixers used in the dispersion include rotor-stator, microfluidizer, high pressure homogenizer, ultrasonic, impinging jet, Cowles blade, planetary mixers, and melt kneading devices such as extruders.

For example, any polyolefin or alkyl cellulose polymer and the long chain linear carboxylic acid dispersing agent or olefin containing dispersing agent, as disclosed above, are melt-kneaded in an extruder along with the aqueous phase (e.g., water) and a volatile base to form a dispersion. Or, the same materials can be first compounded without the volatile base and the aqueous phase, and then melt-kneaded in an extruder in the presence of the aqueous phase (e.g., water), and the volatile base, thereby forming a dispersion.

The dispersion may first be diluted to contain 1 to 20 wt. %, e.g., 1 to 5 wt. % or 1 to 3 wt. %, of the aqueous phase and then, subsequently, further diluted to comprise greater than 25 wt. % of the aqueous phase.

Further dilution may be accomplished via water and/or a solvent as provided herein.

Melt-kneading devices known in the art may be used. For example, a kneader, a BANBURY mixer, single-screw extruder, or a multi-screw extruder, e.g., a twin screw extruder, is used. One example of a suitable extruder system is provided in PCT publication WO 2011/068525 entitled "Extruder Screw".

A process for producing the composition in accordance with the present invention is not particularly limited. For example, an extruder, in certain embodiments, for example, a twin screw extruder, is coupled to a back pressure regulator, melt pump, or gear pump. Exemplary embodiments also provide a volatile base or neutralizing agent reservoir (base reservoir) and an initial aqueous phase reservoir, each of which includes a pump. Desired amounts of volatile base and initial aqueous phase are provided from the base reservoir and the initial aqueous phase reservoir, respectively. Any suitable pump may be used, for example, a pump that provides a flow of 150 cubic centimeters per minute (cc/min) at a pressure of 240 bar can be used to provide the base and the initial aqueous phase to the extruder. Or, a liquid injection pump provides a flow of 300 cc/min at 200 bar or 600 cc/min at 133 bar.

To improve dispersibility, the volatile base or neutralizing agent and initial aqueous phase may be preheated in a preheater.

Any polyolefin or alkyl cellulose polymer (each referred to below as a "base polymer"), in the form of pellets, powder, or flakes, may be fed from the feeder to an inlet of the extruder where the base polymer is melted or compounded. Any dispersing agent, plasticizer or modified polyolefin can also be fed simultaneously with the polyolefin or alkyl cellulose into the extruder via the feeder; or in the alternative, the dispersing agent can be compounded into the base polymer, and then fed into the extruder via the feeder. In the alternative, the dispersing agent can be metered via an inlet prior to the emulsification zone into the molten compound including the base polymer. The dispersing agent can be added with the base polymer or the dispersing agent is provided separately to the extruder. The polymer melt is then delivered from the mix and convey zone to an emulsification zone of the extruder where the initial amount of aqueous phase and base from the aqueous phase and base reservoirs are added through an inlet.

In making any dispersion a modified polyolefin can be added additionally or exclusively to the aqueous phase stream.

Further fluid media may be added via aqueous phase inlet from aqueous phase reservoir in a dilution and cooling zone of the extruder. Typically, the dispersion is diluted to at least 30 wt. % aqueous phase in the cooling zone. In addition, the diluted mixture may be diluted any number of times until the desired dilution level is achieved.

Any dispersion may further be cooled after exiting the extruder by the use of a suitable heat exchanger.

To reduce vapor pressure (e.g., steam pressure) build-up in the extruder and form a polyolefin or cellulose dispersion in a secondary mixing device such as a rotor stator mixer, the aqueous phase is not added into the twin screw extruder but rather to a stream containing the melt after the melt has exited from the extruder and enters the secondary mixing device.

The compositions of the present invention can be formed in a continuous high shear mixer without the use of a melt kneading extruder. Thus, the first stream including one or more liquid or molten polymers is supplied to a continuous high shear mixer from a suitable liquid pump for example, a syringe pump, gear pump, or progressive cavity pump. The first stream is flowed through a first conduit and merged continuously with a second stream containing aqueous phase that is flowed through a second conduit. The first and second streams are merged into a disperser in the presence any or all of dispersing agent, modified polyolefin with the volatile base or neutralizing agent. These agents can be added to either the first or second stream, or as a separate stream. A third stream including the aqueous phase (e.g., water) can be added downstream from the disperser. The flow rates of the streams are adjusted to achieve a dispersion having the desired amount of polymer phase and percent solids. The disperser can be any one of a number of continuous inline mixers, for example, an IKA high-shear mixer, Oakes rotor stator mixer, Ross mixer, Silverson mixer, or centrifugal pump. The rotations-per-minute (rpm) setting of the disperser can be used to help control the particle size of the dispersed hydrophobic phase in the dispersion. The system can be heated to provide the polymer and neutralizer components at a suitable viscosity for pumping. Steam formation is reduced by controlling the pressure through the use of a backpressure regulator, gear pump, metering pump, or other suitable device near the exit of the process. The dispersion may further be cooled after exiting the disperser by the use of a suitable heat exchanger.

Separately, an auxiliary polymer dispersion or emulsion may be used as a portion of the aqueous phase of the dispersion. Examples include, but are not limited to, acrylic, epoxy, polyester, polyurethane, polyolefin, polyamide and the like containing dispersions, emulsions, suspensions, colloidal suspensions.

During the preparation of a composition from the primary polyolefin dispersion and second dispersions of the present invention, any of the one or more fillers, extenders or pigments, one or more additives or auxiliary polymers, may be added to the polyolefin and second dispersions after the dispersion formulation process.

The compositions of the present invention may be applied to the substrates variety of methods; for example, via roller coating, spray coating, powder coating, dip coating, electro deposition coating, printing, wash coating, flow coating, curtain coating.

The compositions of the present invention may also be formed into films, such as via a falling film evaporator or even extrusion through a wide slit to form a film.

The thicknesses of the resulting coating layer can range from 1 micrometer (μm) to 250 μm, for example, from 2 μm or 3 μm to an upper limit of 150 μm, 200 μm or 250 μm. For example, the polyolefin dispersion composition may comprise from 1 μm to 150 μm, or from 1 μm to 200 μm, or from 1 μm to 250 μm, or from 2 μm to 150 μm, or from 2 μm to 200 μm, or from 2 μm to 250 μm, or from 3 μm to 150 μm, or from 3 μm to 200 μm or from 3 μm to 250 μm. One or more coating layers may be applied to a substrate.

The compositions of the present invention can be applied to the at least one surface of the substrate may be dried via a conventional drying method to form the coating layer. Such a conventional drying method includes but, is not limited to, air drying, convection oven drying, hot air drying, and/or infrared oven drying. The compositions applied to the at least one surface of a substrate may be dried, for example, at a temperature in the range of equal or greater than the melting point temperature of the base polymer of the film forming second dispersion; or in the alternative, it may be dried at a temperature in the range of less than the melting point of the base polymer of the primary polyolefin dispersion.

The temperature of the composition applied to any substrate may be raised to a temperature in the range of equal or greater than the melting point temperature of the polymer in the film forming second dispersion dispersion for a period of less than 40 minutes. For example, the temperature of the compositions applied to at least one surface of the substrate may be raised to a temperature in the range of equal or greater than the melting point temperature of the polyolefin in the secondary polyolefin dispersion for less than 20 minutes, or less than 5 minutes, or for a period in the range of from 0.5 to 300 seconds.

Once applied to the substrate, the compositions of the present invention may be dried at a temperature in the range of room temperature to 140° C. for less than 40 minutes, for example, less than 20 minutes, or less than 10 minutes, or less than 5 minutes, or less than 2 minutes, or less than 1 minute or less than 20 seconds. For example, the composition applied to the at least one surface of a substrate may be dried at a temperature in the range of 60 to 100° C. for less than 40 minutes, for example, less than 20 minutes, or less than 10 minutes, or less than 5 minutes, or less than 2 minutes, or less than 1 minute, or in the alternative, the composition applied to the at least one surface of a substrate may be dried at a temperature in the range of 100 to 140° C. for a period of less than 40 minutes, for example, less than 20 minutes, or less than 10 minutes, or less than 5 minutes, or less than 2 minutes, or less than 1 minute.

Suitable substrates are paper, such as paperboard and kraft paper, wood, wood composites, such as oriented strand board, gypsum board, stone, cement, cement board, and other construction substrates, such as gypsum board glass mat facers.

Other suitable substrates include non-wovens, non-woven fabrics made therefrom, such as in coatings for the outer barrier layer of absorbent articles for body use, such as diapers, tampons and catamenials. "Non-woven(s)" refers to any article or sheet-like form made from natural and/or synthetic fibers wherein the fibers are aligned in a random or semi-random order (i.e., not deliberately ordered) whether by mechanical means such as, for example, by entanglement caused by needle-punching, spunbonding, spunlace webs, meltblown webs, air-laid (dry laid) process, and by a wet-laid process; and/or by chemical means such as, for example, treatment with a polymeric binder; or by a combination thereof. Fibers may include cellulosics, jute, sisal, flax, linen and natural fibers, as well as glass, metal, plastic and synthetic fibers. Paper, paperboard and cardboard are all non-wovens.

Examples:

The Examples that follow illustrate the present invention. Unless otherwise stated, in all of the Examples that follow, temperature is room temperature and pressure is atmospheric pressure.

TABLE 1

Raw Materials for Polyolefin Dispersions

| Material | Composition | Melting Point (° C.) | Melt Index | Density (g/cm$^3$) | TE* (%) |
|---|---|---|---|---|---|
| Primary polyolefin dispersion 1 | Polyolefin elastomer | 96 | 30 | 0.902 | 910 |
| Primary polyolefin dispersion 2 | Ethylene-octene block copolymer | 111 | 5.0 | 0.887 | 1000 |
| primary polyolefin dispersion 3 | High density polyethylene | 128 | 44 | 0.951 | 10 |
| Second dispersion polymer 5 OR Primary dispersion polymer 4 | Ethylene/ethylacrylate copolymer (20% EA) | 95 | 21 | 0.930 | 750 |

TABLE 1-continued

Raw Materials for Polyolefin Dispersions

| Material | Composition | Melting Point (° C.) | Melt Index | Density (g/cm³) | TE* (%) |
|---|---|---|---|---|---|
| Primary polyolefin dispersion 4 | Maleated high density polyethylene | 127 | 12 | 0.954 | 100 |
| Second dispersion polymer 1 | Ethylene/octene olefin plastomer | 68 | 1000 | 0.87 | 110 |
| Second dispersion polymer 2 | Ethylene/octene olefin plastomer | 70 | 500 | 0.874 | 190 |
| Base 1 | Dimethyl ethanolamine (DMEA) | | | | |
| Base 2 | Potassium hydroxide (KOH) | | | | |
| Dispersing agent 1 | Sodium laureth sulfate anionic surfactant (70% w/w in water) | | | | |
| Olefin containing dispersing agent 1 | Ethylene acrylic acid copolymer (20% AA) | 77.2 | 300 | 0.958 | 390 |
| Olefin containing dispersing agent 2 | Ethylene acrylic acid copolymer (20% AA) | 75° C. | 1300 | 0.955 | 350 |
| Second dispersion polymer 3 | EHA, Sty, MMA, MAA 3.5 wt. % MAA (as % of mers) single stage emulsion polymer | 40[1] | n/a | n/a | n/a |
| Long chain linear carboxylic acid dispersing agent (~25° C. avg.) | (80/20) Long chain linear primary carboxylic acid/polyethylene | 92 | 120 | — | — |
| Modified polyolefin 1 | Hydrocarbon/maleic anhydride copolymer | 75 | 154 | — | — |
| Modified polyolefin 2 | Maleic anhydride (~5.5 wt. %) modified PE wax | 123 | 45 | 0.99 | |
| Second dispersion polymer 4 | Ethyl cellulose | n/a | n/a | n/a | n/a |

[1]Glass transition temperature (DSC). *Tensile elongation at break

TABLE 2

Dispersion Compositions

| Dispersion | Composition (wt. %, solids) |
|---|---|
| A | 80% Second dispersion polymer 1; 20% Olefin containing dispersing agent 2 |
| B | 84% Second dispersion polymer 5; 12% Modified polyolefin 2; 4% Dispersing agent 1 |
| C | 95.5% Second dispersion polymer 5; 4.5% Long chain linear carboxylic acid dispersing agent +KOH (neutralizing agent) |
| D | 80% Second dispersion polymer 5; 20% Olefin containing dispersing agent 1 |
| E | 94.2% Second dispersion polymer 1; 5.8% Dispersing agent 1 |
| F | 80% Second dispersion polymer 5; 20% Olefin containing dispersing agent 1 |
| G | 78% Primary polyolefin dispersion 3; 15% Modified polyolef in 2; 7% Long chain linear carboxylic acid dispersing agent |
| H | 80% Second dispersion polymer 1; 20% Olefin containing dispersing agent 2 with DMEA |
| I | 88% Primary polyolefin dispersion 1; 7% Modified polyolefin 2; 5% Long chain linear carboxylic acid dispersing agent with DMEA |
| J | 86% Primary polyolefin dispersion 2; 7% Modified polyolefin 1; 7 Long chain linear carboxylic acid dispersing agent with DMEA |
| K | 74% Second dispersion polymer 4; 17% dibutyl sebacate[1]; 9% oleic acid[2] with ammonia |
| L | 78% Primary polyolefin dispersion 3; 15% Modified polyolef in 2; 7% Long chain linear carboxylic acid dispersing agent |
| M | Second dispersion polymer 2; Olefin containing dispersing agent 1 (80/20) |
| N | Second dispersion polymer 2; Olefin containing dispersing agent 1 (80/20) |
| O | Second dispersion polymer 3; Measured Tg - 40° C.; 41.5 wt. % solids; pH 7.5, contains ammonia |
| P | Same as E, above. |

[1]Plasticizer; [2]Long chain linear carboxylic acid dispersing agent.

SYNTHESIS EXAMPLES

Dispersion Preparation

Dispersions A to P

Aqueous dispersions A to P having compositions as disclosed in Table 2, above, were formed from raw materials disclosed in Table 1, above, using the conditions as described in Table 3, below, were prepared using the following general procedure:

Components 1 to 3 listed in Table 3, below, were fed into a 25 mm diameter twin screw extruder using a controlled rate feeder; using the feed rate in grams/minute (g/min) as indicated in Table 3. Components 1 to 3 were forwarded through the extruder and melted to form a liquid melt material.

The extruder temperature profile was ramped up to the temperature listed in the "Polymer Melt Zone" column of Table 3, below. Water and volatile base and/or neutralizing agent were mixed together and fed to the extruder at a rate indicated in Table I for neutralization at an initial water introduction site. Then dilution water was fed into the extruder in one or two locations (1$^{st}$ and 2$^{nd}$ locations) via two separate pumps at the rates indicated in Table 3. The extruder temperature profile was cooled back down to a temperature below 100° C. near the end of the extruder. The extruder speed was around 470 rpm in most cases as recorded in Table 3. At the extruder outlet, a backpressure regulator was used to adjust the pressure inside the extruder barrel to a pressure adapted to reduce steam formation (generally, the pressure was from 2 MPa to 4 MPa).

Each aqueous dispersion exited from the extruder and was filtered through a 200 micrometer (μm) filter. The resultant filtered aqueous dispersions had a solids content measured in weight percent (wt. %); and the solids particles of the dispersion had a volume mean particle size measured in microns and recorded in Table 3, below. In some cases the particle size mode is also recorded. The solids content of the aqueous dispersion was measured using an infrared solids analyzer; and the particle size of the solids particles of the aqueous dispersion was measured using a COULTER™ LS-230 particle size analyzer (Beckman Coulter Corporation, Brea, Calif.). The solids content and the average particle size (PS) of the solids particles of the dispersion are indicated in Table 3, below.

TABLE 3

Composition and Process Conditions for Dispersions A to P

| Dispersion | Polymer (feed rate, g/min) | Part 2 (feed rate, g/min) | Part 3 (feed rate, g/min) | Initial Water feed rate (g/min) | Base/Surfactant feed rate (g/min) | Dilution Water 1$^{st}$/2$^{nd}$ feed rate (g/min) | Extruder Temp in Polymer Melt Zone (° C.) | Extruder Speed (rpm) |
|---|---|---|---|---|---|---|---|---|
| A | Second dispersion polymer 1 (60.5) | n/a | olefin containing dispersing agent 2 (15.1) | (14.4) | DMEA (5.8) | 85/0 | 90 | 470 |
| B | Primary polyolefin dispersion 4 (93.7) | Modified Polyolefin 2 (13.4) | n/a | (3.4) | Dispersing agent 1 (6.4) | 105 | 150 | 450 |
| C | Primary dispersion polymer 4 (108.4) | n/a | Long chain linear carboxylic acid dispersing agent (5.1) | (2.0) | 23% wt. KOH (2.2) | 106/0 | 160 | 470 |
| D | Primary dispersion polymer 4 (60.5) | n/a | olefin containing dispersing agent 1 (15.1) | (12.0) | DMEA (4.6) | 70/0 | 160 | 470 |
| E | Second dispersion polymer 1 (53) | n/a | n/a | (2.0) | Dispersing agent 1 (3.3) | 60/0 | 80 | 470 |
| F | Primary dispersion polymer 4 (90.8) | n/a | olefin containing dispersing agent 1 (22.7) | (18.0) | DMEA (6.9) | 110/0 | 160 | 470 |
| G | Primary polyolefin dispersion 3 (59.0) | Modified Polyolefin 2 (11.3) | Long chain linear carboxylic acid dispersing agent (5.3) | (18.3) | DMEA (2.5) | 80/0 | 160 | 470 |
| H | Second dispersion polymer 1 (60.5) | n/a | olefin containing dispersing agent 2 (15.1) | (14.4) | DMEA (5.8) | 85/0 | 90 | 470 |
| I | Primary polyolefin dispersion 1 (66.5) | Modified Polyolefin 2 (5.3) | Long chain linear carboxylic acid dispersing agent (3.8) | (11.5) | DMEA (1.4) | 75/0 | 160 | 470 |
| J | Primary polyolefin dispersion 2 (65.0) | Modified Polyolefin 1 (5.3) | Long chain linear carboxylic acid dispersing agent (5.3) | (7.8) | DMEA (3.7) | 80/0 | 130 | 470 |
| K | Second dispersion polymer 4 (42.0) | Dibutyl sebacate (9.6) | Oleic acid (5.1) | (14.6) | 28% ammonia (2.2) | 140/0 | 145 | 470 |
| L | Primary polyolefin dispersion 3 (235.9) | Modified Polyolefin 2 (45.4) | Long chain linear carboxylic acid dispersing agent (21.2) | (73.1) | DMEA (8.9) | 240/110 | 160 | 1200 |
| M | Second dispersion polymer 2 (60.4) | n/a | Modified Polyolefin 1 (15.1) | (15.5) | DMEA (5.8) | 90/0 | 90 | 470 |
| N | Second dispersion polymer 2 (60.4) | n/a | Modified Polyolefin 1 (15.1) | (15.5) | DMEA (5.6) | 90/0 | 90 | 470 |

TABLE 3-continued

Composition and Process Conditions for Dispersions A to P

| | | | | | | | | |
|---|---|---|---|---|---|---|---|---|
| O | Second dispersion polymer 3 | n/a | n/a | n/a | n/a | n/a | n/a | n/a |
| P | Second dispersion polymer 1 (53) | n/a | n/a | (2.0) | Dispersing agent 1 (3.3) | 60/0 | 80 | 470 |

| Dispersion | % Solids | Particle Size Vmean (microns) | pH | Viscosity cP (Rv2, 50 rpm) |
|---|---|---|---|---|
| A | 38.11 | 0.19 | 9.9 | 407 |
| B | 50.5 | 0.79 | 3 | 100 |
| C | 54.03 | 1.6 | 11 | n/m |
| D | 49.09 | 3.4 | 9.97 | 1672 |
| E | 53.9 | 0.64 | 3.7 | 596 |
| F | 49.1 | 11.2 | | n/m |
| G | 48.29 | 2.5 | 9.5 | 320 |
| H | 42.53 | 0.152 | 9.8 | 1250 |
| I | 51.08 | 2.78 | 9.2 | 1920 |
| J | 46.76 | 2.86 | 9.9 | 722 |
| K | 26.5 | 0.19 | 9.0 | 25 |
| L | 50.04 | 2.71 | 9.2 | 440 |
| M | 34.31 | 0.523 (128 nm mode) | 9.8 | 168 |
| N | 35.7 | 0.44 (135 nm mode) | 9.8 | 248 |
| O | n/a | n/a | n/a | n/a |
| P | 53.9 | 0.64 | 3.7 | 596 |

Coating preparation: Films of each sample were made using a 152.4 micron (6 mil) drawdown bar on either uncoated printer paper, or coated Leneta chart paper. The films were cured at 90° C. for 10 minutes.

Test methods:

Moisture vapor transport: Measurements were taken by filling glass jars with a known amount of deionized (DI) water, covering the top of each jar with either a control (uncoated printer paper) or a paper sample coated with the indicated composition. The edges of the paper were sealed with electrical tape. The samples were placed in a constant temperature (23° C.) constant relative humidity (50%) chamber. The initial weight was recorded and weight loss was measured for up to 14 days to determine the water loss through the coated paper or control. The rate was calculated in grams/m²-day and compared to the uncoated paper control.

One aspect of the present invention is the ability to have high moisture vapor transport through these coatings (acceptable performance is >50% of the moisture vapor transport rate of the uncoated substrate (labeled "control").

Hydrophobicity: Hydrophobicity of each coating was evaluated by measuring the contact angle of a water droplet on the surface of the coating. Contact angle measurements were made using a VCA Optima™ Contact Angle device (AST Products, Inc., Billerica, Mass.), with a 1 µl drop of deionized water. Values reported above are the average of three measurements. Acceptable contact angles are at least 115 degrees.

The second aspect of this invention is the ability of the coating to be a barrier to liquid water. A way to measure the water repellency of a coating is by measuring the contact angle of a water droplet on the surface of the coating. The higher the contact angle, the more hydrophobic the coating.

While the coating made with the blend of Dispersion G (primary polyolefin dispersion) and Dispersion B (secondary polyolefin dispersion) have good vapor transport, it lacks good liquid water barrier properties as evidenced by the low contact angle (how well liquid water wets the coating surface). In contrast, the coating made with Dispersion A as the "binder" POD (secondary polyolefin dispersion) has very good moisture vapor transport properties and very high water contact angles (>123°). Results of performance testing of the various Examples are reported in Table 4, below.

TABLE 4

Moisture Vapor Transport (MVTR) and Contact Angle Measurements on Uncoated Paper

| Example | Primary Dispersion | Second Dispersion | Wt.% Second Dispersion | Particle Size Ratio | Contact Angle Average | MVTR (g-m²/day) 704 (n = 7) Control (uncoated Printer Paper) | % of Control |
|---|---|---|---|---|---|---|---|
| Inventive Examples | | | | | | | |
| 1 | I | H | 5 | 18 | 134 | 585.34 | 83.1 |
| 2 | I | H | 10 | 18 | 130 | 455.36 | 64.7 |
| 3** | I | H | 15 | 18 | 131 | 313.89 | 44.6 |
| 4** | I | H | 20 | 18 | 117 | 168.00 | 23.9 |
| 5 | L | N | 5 | 22 | 134 | 565.9 | 80.4 |
| 6 | L | N | 10 | 22 | 130 | 550.0 | 78.1 |

TABLE 4-continued

Moisture Vapor Transport (MVTR) and Contact Angle Measurements on Uncoated Paper

| Example | Primary Dispersion | Second Dispersion | Wt.% Second Dispersion | Particle Size Ratio Average Control | Contact Angle | MVTR (g-m$^2$/day) 704 (n = 7) | % of Control |
|---|---|---|---|---|---|---|---|
| | | | | (uncoated Printer Paper) | | | |
| 7 | L | N | 15 | 22 | 131 | 426.2 | 60.5 |
| 8 | L | N | 20 | 22 | 117 | 407.6 | 57.9 |
| 9 | G | A | 10 | 13.2 | 123 | 595.9 | 84.6 |
| 10 | G | A | 20 | 13.2 | 131 | 412.0 | 58.5 |
| 11** | G | A | 30 | 13.2 | 123 | 146.8 | 20.8 |
| 12 | G | A | 5 | 13.2 | 126 | 618.9 | 87.9 |
| 13 | G | P | 5 | 3.2 | 123 | 641.0 | 91.0 |
| 14 | G | P | 10 | 3.2 | 117 | 604.8 | 85.9 |
| 15 | G | P | 15 | 3.2 | 115 | 511.1 | 72.6 |
| 16 | L | K | 5 | 14 | 119 | 576.5 | 81.9 |
| 17 | L | O | 5 | 29 | 129 | 466.9 | 66.3 |
| 18 | L | O | 10 | 29 | 127 | 499.6 | 71.0 |
| 19 | L | O | 15 | 29 | 117 | 412.0 | 58.5 |
| Comparative Examples | | | | | | | |
| 20 | L | O | 20 | 29 | 93 | 546.4 | 77.6 |
| 21 | G | P | 20 | 3.2 | 112 | 458.0 | 65.0 |
| 22 | L | K | 10 | 14 | 107 | 577.4 | 82.0 |
| 23 | L | K | 15 | 14 | 99 | 594.2 | 84.4 |
| 24 | L | K | 20 | 14 | 107 | 592.4 | 84.1 |
| 25 | B | H | 10 | 5.2 | ND | 646.3 | 91.8 |
| 26 | B | H | 20 | 5.2 | 52 | 489.8 | 69.6 |
| 27 | B | H | 30 | 5.2 | 37 | 47.7 | 6.8 |
| 28 | B | H | 40 | 5.2 | 52 | 46.9 | 6.7 |
| 29 | F | H | 5 | 74 | 104 | 17.7 | 2.5 |
| 30 | F | H | 10 | 74 | 106 | 17.7 | 2.5 |
| 31 | F | H | 15 | 74 | 107 | 16.8 | 2.4 |
| 32 | F | H | 20 | 74 | 106 | 15.0 | 2.1 |
| 33 | E* | H | 10 | 4.2 | 58 | 322.7 | 45.8 |
| 34 | E* | H | 20 | 4.2 | 61 | 17.7 | 2.5 |
| 35 | E* | H | 30 | 4.2 | 59 | 15.9 | 2.3 |
| 36 | E* | H | 40 | 4.2 | 65 | 15.9 | 2.3 |
| 37 | D | H | 5 | 22 | 105 | 36.25 | 5.1 |
| 38 | D | H | 10 | 22 | 107 | 18.57 | 2.6 |
| 39 | D | H | 15 | 22 | 104 | 18.57 | 2.6 |
| 40 | D | H | 20 | 22 | 107 | 15.92 | 2.3 |
| 41 | J | H | 5 | 19 | 122 | 182.14 | 25.9 |
| 42 | J | H | 10 | 19 | 123 | 48.63 | 6.9 |
| 43 | J | H | 15 | 19 | 116 | 38.02 | 5.4 |
| 44 | J | H | 20 | 19 | No data | No data | ND |
| 45 | G | B | 5 | 3.2 | 115 | 602.1 | 85.5 |
| 46 | G | B | 10 | 3.2 | 103 | 595.9 | 84.6 |
| 47 | G | B | 15 | 3.2 | 90 | 580.0 | 82.4 |
| 48 | G | B | 20 | 3.2 | 91 | 596.8 | 84.8 |

**-Denotes Comparative;
*-Denotes second dispersion polymer used in place of primary polyolef in dispersion polymer Inventive Examples have both high moisture vapor transport measurements, as well has high (>115 degree) contact angles. Exceptions were those in which too high an amount of the second dispersion polymer were present; in those Examples 3, 4 and 11, the second dispersion polymer was soft and fluid and filled in too much interstitial space and reduced the porosity of the coating. Thus, the preferred amount of the second dispersion polymer in the Dispersion I/Dispersion H blend is <15% the total solids of the primary polyolefin and the secondary polymer in the composition. For the Dispersion G/Dispersion A blends, the preferred amount of the second dispersion polymer is <30% of the total solids of the primary and secondary polymer in the composition. In Example 21, too much of the alkyl cellulose interfered with hydrophobicity; it is preferable to use 17.5% or less alkyl cellulose, based on the total solids of the primary polyolefin and the secondary polymer in the composition. Too much acrylic binder in the Dispersion L/Dispersion O blends reduces the contact angle due to the increased amount of surfactant introduced into the system, thus reducing the hydrophobicity of the blend.

We claim:

1. A composition comprising a blend of (i) a primary polyolefin dispersion of one or more large particle size polyolefins having a melting point of at least 95° C., and an average particle size of from 1 to 5 microns, and containing a volatile base and a 14 to 40 carbon long chain linear carboxylic acid dispersing agent, and (ii) a film forming second dispersion of one or more polymers having an average particle size of from 0.1 to 1.0 microns chosen from an amount of 10 to 30 wt. %, as solids of one or more polyolefins having a melting point from 50 to 90° C. further containing an at least partially neutralized olefin containing dispersing agent, an amount of not more than 7.5 wt. % as solids of one or more alkyl celluloses which further contain a plasticizer having a boiling point of 250° C. or greater and containing an at least partially neutralized olefin containing dispersing agent, and an amount of not more than 17.5 wt.

%, as solids of one or more acrylic emulsion polymers having a Tg of from 0 to 60° C. or, wherein in the blend of primary polyolefin dispersion and the second dispersion, the particle size ratio of the primary polyolefin dispersion to the second dispersion ranges from 3:1 to 29:1.

2. The composition as claimed in claim 1, wherein the melting point of the one or more polyolefins in the primary polyolefin dispersion ranges from 95 to 180° C.

3. The composition as claimed in claim 1, wherein the amount of the second dispersion of one or more polymer ranges from 10 to 27.5 wt. %.

4. The composition as claimed in claim 1, wherein the average particle size of the one or more polymer in the second dispersion ranges from 0.12 to 0.7 microns.

5. The composition as claimed in claim 1, wherein the melting point of the one or more polymer in the second dispersion ranges from 60 to 90° C.

6. The compositions in accordance with 1, above, further comprising one or more pigments, fillers or extenders.

7. The composition as claimed in claim 1, wherein the (i) primary polyolefin dispersion contains as a dispersing agent a long chain linear carboxylic acid which is a linear fatty acid.

8. The composition as claimed in claim 1, wherein the (i) one or more polymers in the primary polyolefin dispersion is chosen from a polyolefin elastomer, a high density polyethylene, ethylene-propylene copolymers, polypropylenes, olefin block copolymers, and mixtures thereof.

9. The composition as claimed in claim 1, wherein the (ii) one or more polymers in the second dispersion is a polyolefin and comprises a polyolefin plastomer, a linear low density polyethylene, an ethylene-$C_4$ to $C_{12}$ olefin copolymers, or mixtures thereof.

10. The composition as claimed in claim 1, wherein the melting point of each of the one or more polyolefins in the (i) primary polyolefin dispersion is at least 20° C. higher than the melting point of each of the one or more polymers in the film forming second dispersion.

* * * * *